United States Patent
Foo

(10) Patent No.: US 10,950,940 B2
(45) Date of Patent: Mar. 16, 2021

(54) ELECTRONICALLY BEAM-STEERABLE FULL-DUPLEX PHASED ARRAY ANTENNA

(71) Applicant: Senglee Foo, Ottawa (CA)

(72) Inventor: Senglee Foo, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 224 days.

(21) Appl. No.: 16/040,054

(22) Filed: Jul. 19, 2018

(65) Prior Publication Data

US 2020/0028261 A1 Jan. 23, 2020

(51) Int. Cl.
*H01Q 3/36* (2006.01)
*H04B 1/44* (2006.01)
*H01Q 21/24* (2006.01)
*H01Q 3/04* (2006.01)
*H01Q 15/24* (2006.01)
*H04L 5/16* (2006.01)
*H01Q 21/00* (2006.01)

(52) U.S. Cl.
CPC .............. *H01Q 3/36* (2013.01); *H01Q 3/04* (2013.01); *H01Q 15/242* (2013.01); *H01Q 21/0031* (2013.01); *H01Q 21/24* (2013.01); *H04B 1/44* (2013.01); *H04L 5/16* (2013.01)

(58) Field of Classification Search
CPC .......... H01Q 3/36; H01Q 3/04; H01Q 15/242; H01Q 21/0031; H01Q 21/24; H04B 1/44; H04L 5/16
USPC .......................................................... 370/278
See application file for complete search history.

(56) References Cited

U.S. PATENT DOCUMENTS

| | | | |
|---|---|---|---|
| 2015/0244079 A1 | 8/2015 | White et al. | |
| 2018/0076521 A1* | 3/2018 | Mehdipour | H01Q 5/335 |
| 2018/0269576 A1* | 9/2018 | Scarborough | H01Q 3/14 |
| 2019/0013583 A1* | 1/2019 | Paulsen | H01Q 3/40 |
| 2019/0036226 A1* | 1/2019 | Ding | H01Q 5/307 |
| 2019/0103665 A1* | 4/2019 | Yoo | H01Q 1/364 |
| 2019/0238375 A1* | 8/2019 | Bowen | H01Q 21/0012 |
| 2019/0379118 A1* | 12/2019 | Rmili | H01Q 3/32 |
| 2020/0067281 A1* | 2/2020 | Curwen | H01S 5/423 |
| 2020/0081099 A1* | 3/2020 | Shaltout | G02B 5/18 |

FOREIGN PATENT DOCUMENTS

| | | |
|---|---|---|
| CN | 105098344 A | 11/2015 |
| CN | 105811117 A | 7/2016 |
| CN | 106681026 A | 5/2017 |
| WO | 2018054204 A1 | 3/2018 |

OTHER PUBLICATIONS

Senglee Foo:"Liquid-crystal-tunable metasurface antennas", 2017 11th European Conference on Antennas and Propagation (EUCAP), IEEE 2017. pp. 3026-3030.

* cited by examiner

*Primary Examiner* — Christopher R Crompton

(57) ABSTRACT

An electronically beam-steerable full-duplex phased array antenna is described. The phased array antenna includes an array of a plurality of radiating elements. The array includes at least one column having a plurality of radiating elements, and the array is configured to generate a radiation field. The phased array antenna includes a metasurface over the array of radiating elements. The metasurface introduces a phase shift to the radiation field of the array, to cause a beam of the phased array antenna to be angularly offset from the radiation field of the array.

17 Claims, 13 Drawing Sheets

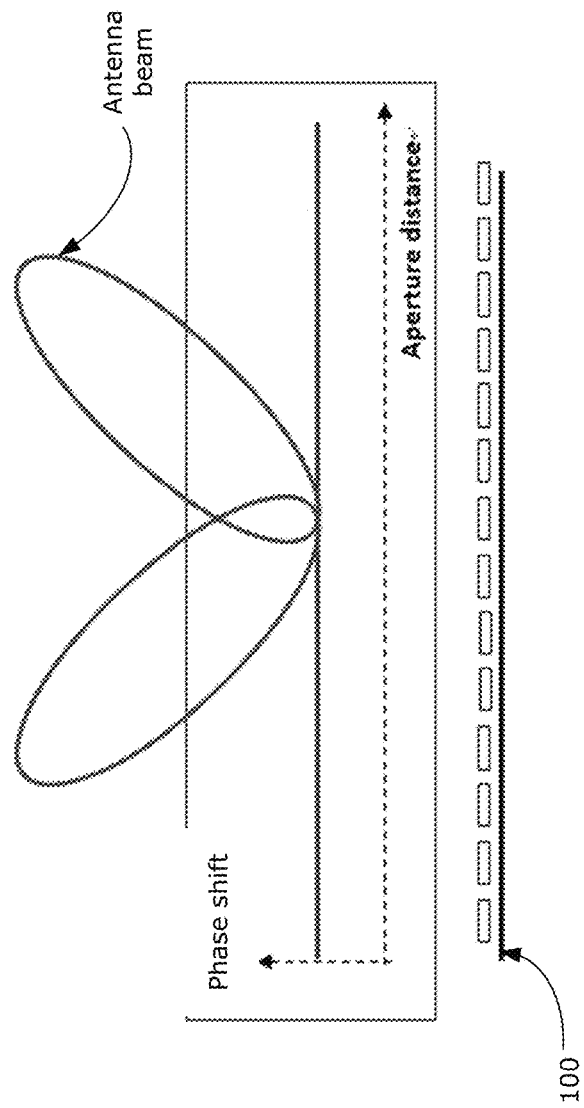
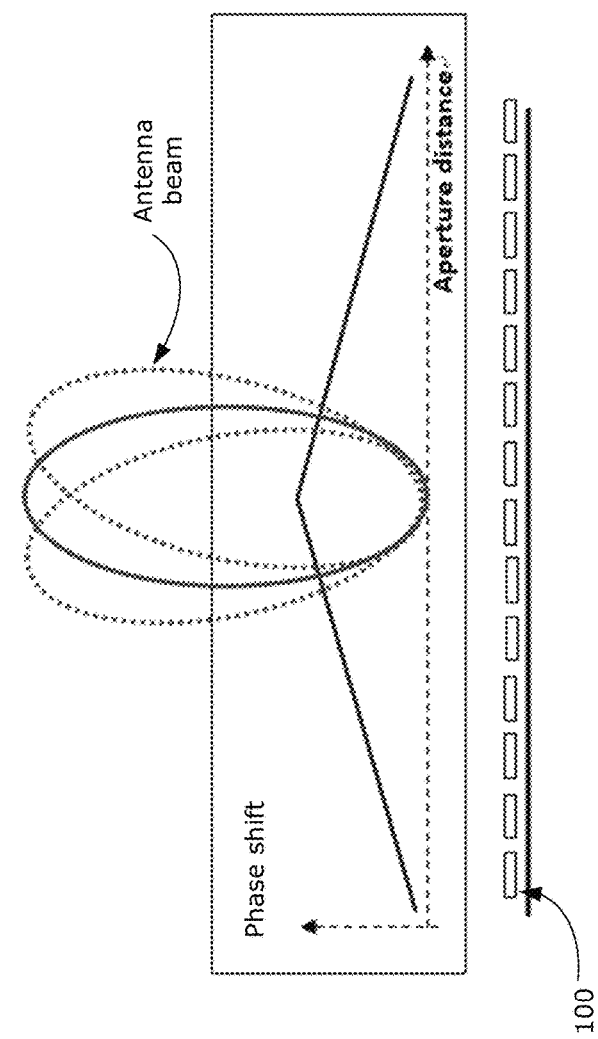

ELECTRONICALLY BEAM-STEERABLE FULL-DUPLEX PHASED ARRAY ANTENNA

FIELD

The present disclosure relates to array antennas, including beam-steerable phased array antennas for full-duplex wireless communications.

BACKGROUND

In-band full-duplex radio technology has been of interest for wireless communications, including for use in fifth-generation (5G) wireless networks, with transmission and reception of radio signals using a common antenna and transceiver. In full-duplex communications, transmission signals and reception signals are communicated using the same time-frequency resource (e.g., using the same carrier frequency at the same time). As a result, overall capacity of the channel can be increased by a factor of two.

Currently, proposed 5G massive-multiple-input multiple-output (massive-MIMO) technology has been limited to using a time division duplexing (TDD) transmission scheme, in which transmission and reception signals share the same frequency resources, but different time resources (e.g., using alternating time slots for transmission and reception). Current massive-MIMO technology has been found to be not suited for frequency division duplexing (FDD) transmission scheme, due to the need for different channel models in the transmitter and receiver. However, TDD and FDD may not be considered true full-duplex technology, because transmission and reception either do not share the same time resource (as in TDD) or do not share the same frequency resource (as in FDD), and may not realize the full benefits of full-duplex communications.

Currently, there has not yet been developed a beam-steerable phased array antenna that is suitable for full-duplex communications. The challenges to developing a full-duplex phased array antenna include the challenge of mitigating self-interference (SI). For example, in a closely packed two-dimensional (2D) array antenna, there is a relatively high level of SI leakage signal from the transmit path to the receive path, due to internal and external couplings. In a full-duplex array antenna, this SI, which is caused by mutual coupling from transmitter to receiver, should be reduced (e.g., to below the thermal noise floor) to avoid significant system interference or distortion in the receiver. For a 5G 20 MHz signal bandwidth, for example, over 100 dB of SI suppression may be required to avoid unacceptable receiver interference from leakage of internal transmit signals. Currently, a typical base-station array antenna may provide port isolation of typically 30 dB. Further SI suppression is needed, which may require two- or three-stage SI cancellation in the receiver, for example using analog and digital cancellation circuitry. This may not be desirable because the use of many stages in the receiver for SI cancellation may lead to added signal saturation and/or distortion in the receiver.

It is therefore desirable to provide an array antenna that provides higher port isolation between transmit and receive ports, to enable implementation of true full-duplex communications. It may be further desirable for such an array antenna to provide a relatively large scan angle and relatively wide frequency bandwidth, for practical use.

SUMMARY

The present disclosure describes examples of a beam-steerable phased array antenna (also referred to simply as a phased array), suitable for full-duplex communications. The disclosed phased array includes the use of a metasurface, which enables the angle of the antenna beam to be offset to an angle suitable for practical use. The disclosed phased array utilizes high degrees of linearly progressive phases to cancel or suppress mutual coupling. The disclosed antenna may be useful for massive-MIMO communications, and may enable communications using FDD as well as TDD, and also may enable communications in true full-duplex mode.

In some aspects, the present disclosure describes a beam-steerable phased array antenna including an array of a plurality of radiating elements. The array includes at least one column having a plurality of radiating elements, and the array is configured to generate a radiation field. The phased array antenna also includes a metasurface over the array of radiating elements. The metasurface introduces a phase shift to the radiation field of the array, to cause a beam of the phased array antenna to be angularly offset from the radiation field of the array.

In any of the preceding aspects/embodiments, the plurality of radiating elements may include dual-polarized radiating elements.

In any of the preceding aspects/embodiments, each dual-polarized radiating element may provide isolation in the range of about 40 dB to about 50 dB between transmit and receive ports.

In any of the preceding aspects/embodiments, the plurality of radiating elements may include single-polarized radiating elements.

In any of the preceding aspects/embodiments, the antenna may further include a plurality of circulators, each circulator being coupled to a respective radiating element.

In any of the preceding aspects/embodiments, the metasurface may be a single-polarized metasurface.

In any of the preceding aspects/embodiments, the metasurface may be a dual-polarized metasurface.

In any of the preceding aspects/embodiments, the array may have a single column of radiating elements.

In any of the preceding aspects/embodiments, the array of radiating elements may include a plurality of columns.

In any of the preceding aspects/embodiments, the metasurface may provide a linear phase shift distribution along at least one axis.

In any of the preceding aspects/embodiments, the metasurface may provide no phase shift or a constant phase shift distribution along a first axis, and may provide a varying phase shift distribution along a second axis orthogonal to the first axis.

In any of the preceding aspects/embodiments, the varying phase shift distribution along the second axis may have a profile along the second axis in which the phase shift increases from opposite ends of the metasurface along the second axis towards a maximum phase shift near a middle of the metasurface along the second axis.

In some aspects, the present disclosure describes a base station including a phased array antenna for transmission and reception of wireless communications. The phased array antenna includes an array of a plurality of radiating elements. The array includes at least one column having a plurality of radiating elements, and the array is configured to generate a radiation field. The phased array antenna also includes a metasurface over the array of radiating elements. The metasurface introduces a phase offset to the radiation field of the array, to cause a beam of the phased array antenna to be angularly offset from the radiation field of the array. The base station also includes a transmitter coupled to the phased array antenna for providing a transmit signal, and a receiver coupled to the phased array antenna for receiving a receive signal.

In any of the preceding aspects/embodiments, the receiver may include a single self-interference cancellation stage.

In any of the preceding aspects/embodiments, in the phased array antenna, the metasurface may provide a linear phase shift distribution along at least one axis.

In any of the preceding aspects/embodiments, in the phased array antenna, the metasurface may provide no phase shift or a constant phase shift distribution along a first axis, and may provide a varying phase shift distribution along a second axis orthogonal to the first axis.

In any of the preceding aspects/embodiments, the varying phase shift distribution along the second axis may have a profile along the second axis in which the phase shift increases from opposite ends of the metasurface along the second axis towards a maximum phase shift near a middle of the metasurface along the second axis.

In any of the preceding aspects/embodiments, the base station may also include a processing device to control progressive phases applied to the phased array antenna. The processing device may be configured to set progressive phases sufficiently high to cause self-cancellation of mutual coupling in the array of radiating elements.

In any of the preceding aspects/embodiments, the base station may be configured to conduct full-duplex communications using the phased array antenna.

BRIEF DESCRIPTION OF THE DRAWINGS

Reference will now be made, by way of example, to the accompanying drawings which show example embodiments of the present application, and in which:

FIGS. 9A and 9B illustrate possible phase distributions of a dual-polarized metasurface, for an example electronically beam-steerable full-duplex phased array antenna as disclosed herein.

Similar reference numerals may have been used in different figures to denote similar components.

DESCRIPTION OF EXAMPLE EMBODIMENTS

Examples of array antennas, including self-cancellation full-duplex steerable phased array antennas, are described. Examples described herein may be suitable for use in 5G wireless communications. The disclosed phased array antenna includes a metasurface (e.g., a metamaterial metal surface, or a metamaterial thin film) capable of introducing a phase offset. In some examples, the disclosed phased array antenna may be implemented using dual-polarized radiating elements with relatively high port isolation. Examples of dual-polarized radiating elements having relatively high port isolation (e.g., isolation of about 40 dB to about 50 dB) are described in U.S. patent application Ser. No. 16/039,853. Examples of the disclosed phased array antenna may be able to achieve about 60 dB or more of self-interference (SI) suppression between the transmitter and receiver ports, over a relatively broad beam scan angle. Examples of the disclosed phased array antenna may enable the use of single-stage receiver cancellation to achieve a total amount of SI suppression that is sufficient for full-duplex transmission (e.g., total suppression of about 100 dB). Examples of the disclosed phased array antenna may also help to avoid or reduce signal distortion at the receiver front-end.

Figure 1A:
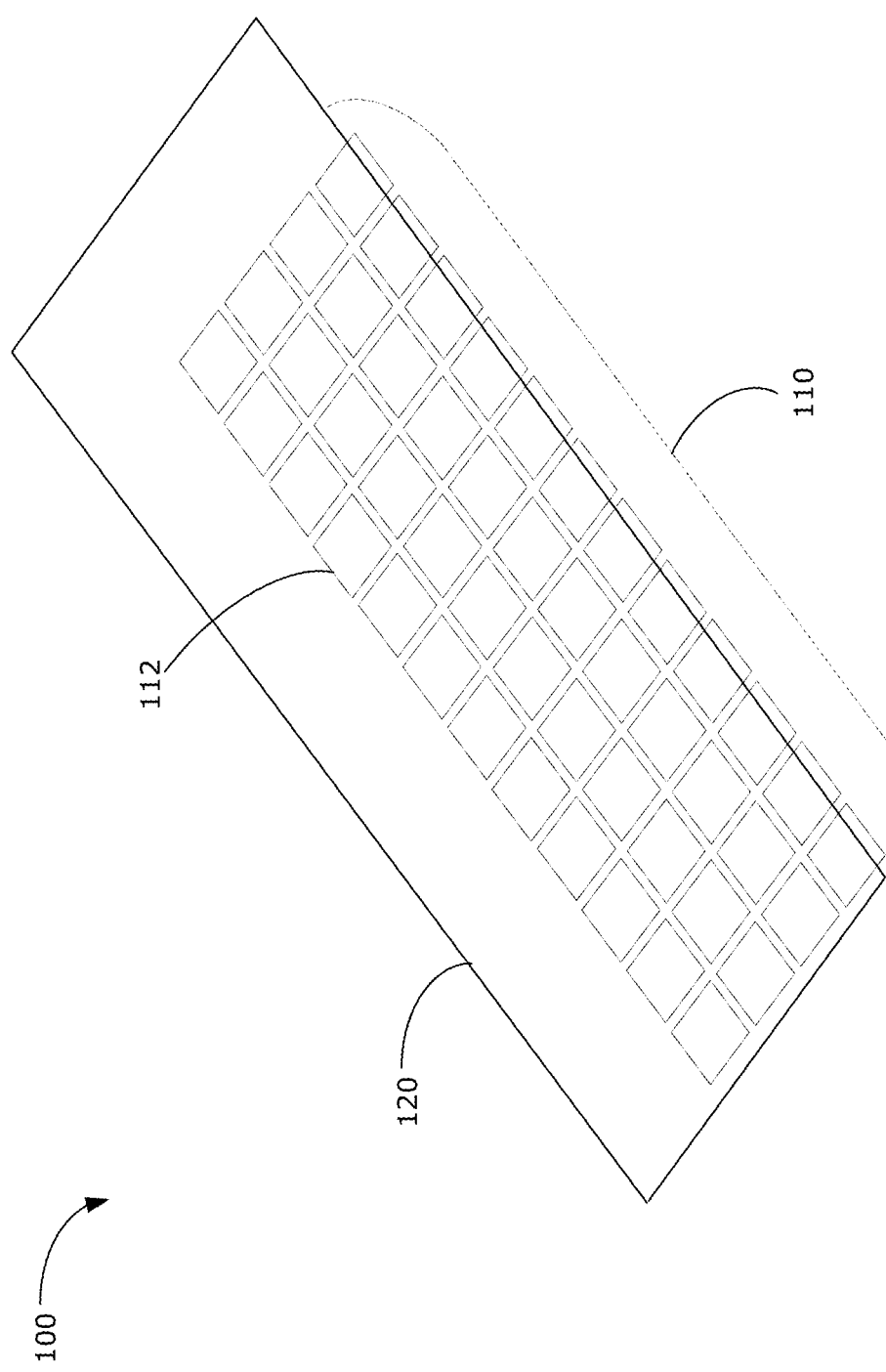
FIGS. 1A-1C show perspective, top and side views, respectively, of an example phased array antenna as disclosed herein.
Figure 1B:
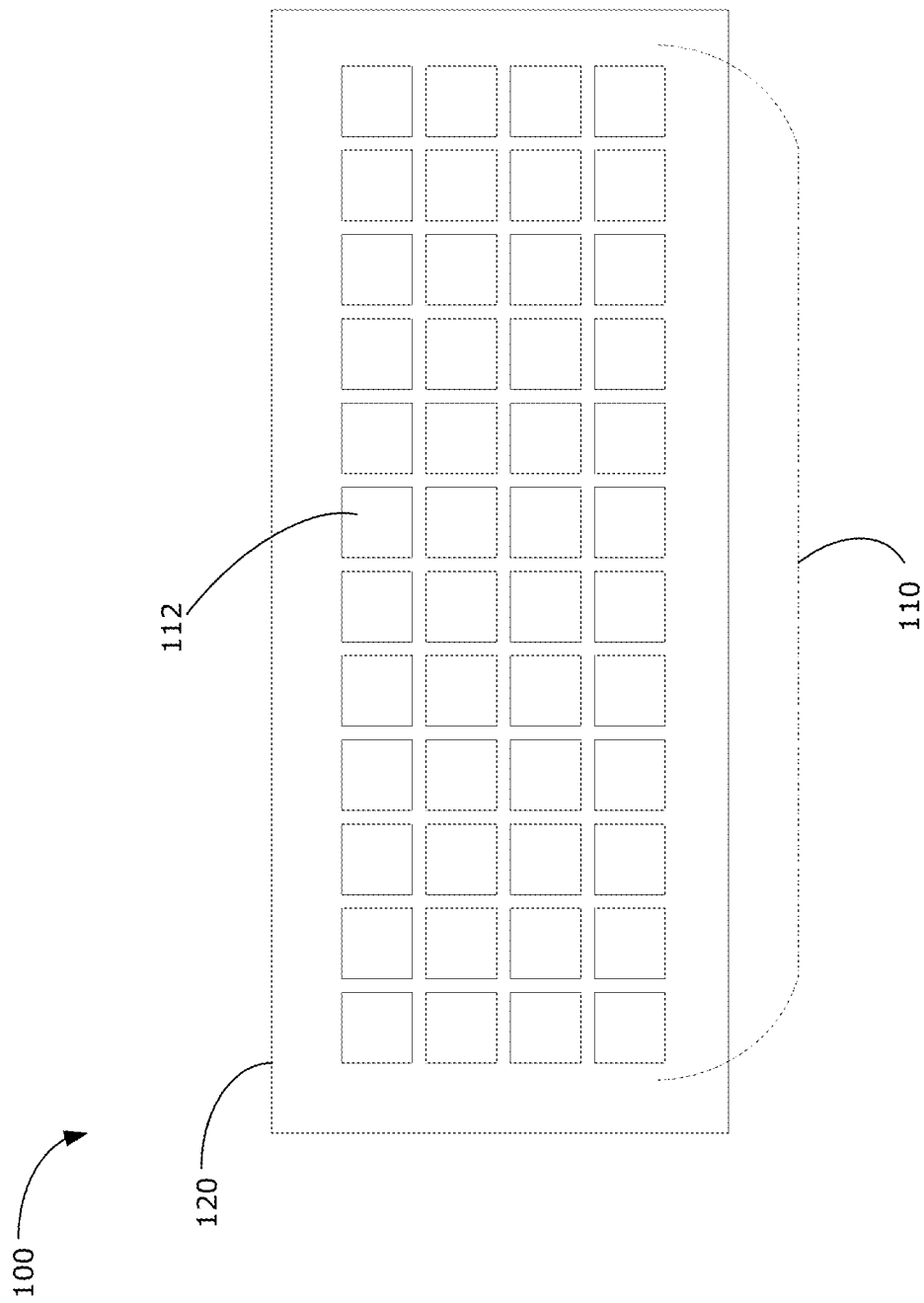
Figure 1C:
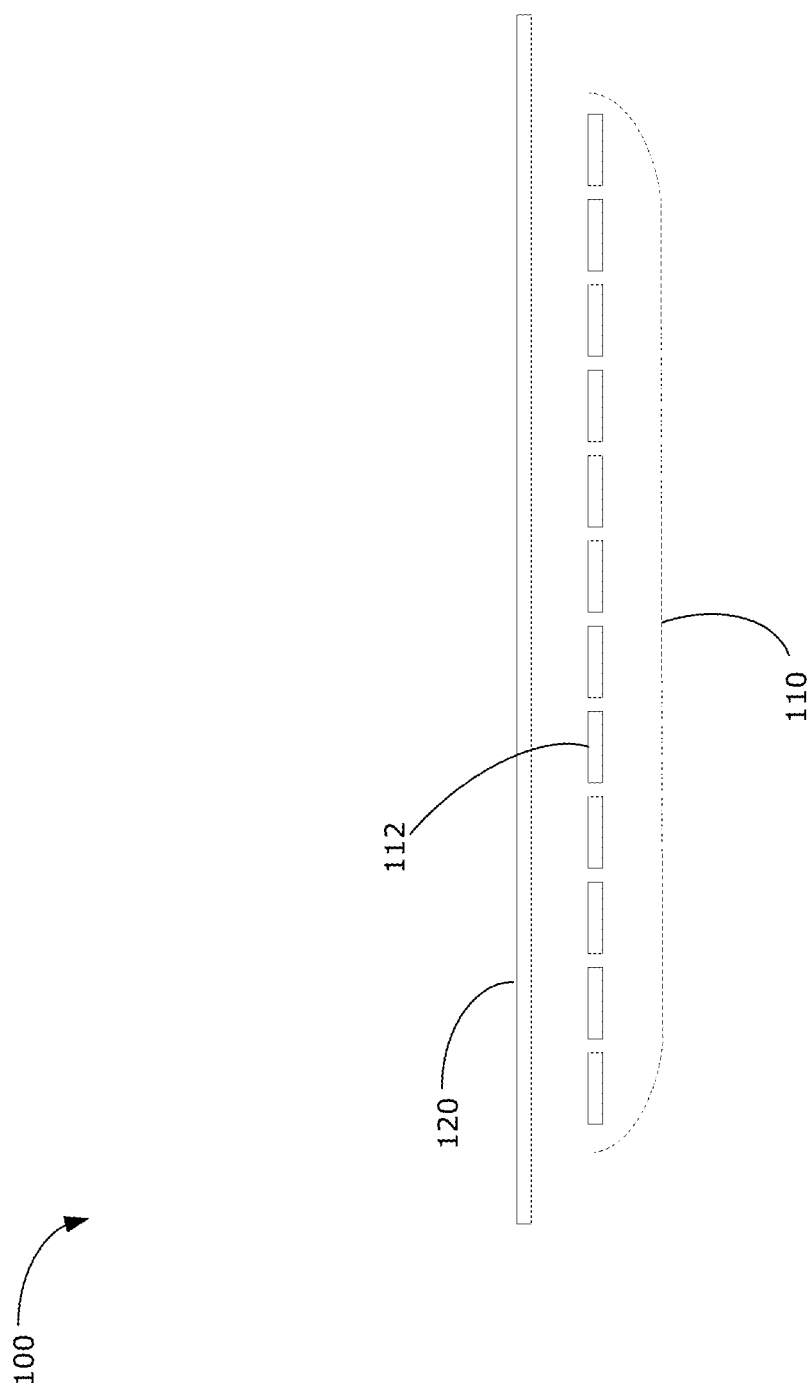

FIGS. 1A-1C show perspective, top and side views, respectively, of an example phased array antenna 100 as disclosed herein. The phased array antenna 100 (also referred to herein simply as the antenna 100) includes an array 110 of a plurality of radiating elements 112, which may be supported by a substrate (not shown), such as a printed circuit board (PCB). In the example shown, the array 110 includes a plurality of linear columns of radiating elements 112. In other examples, the array 110 may be a single column of radiating elements 112. The antenna 100 also includes a metasurface 120 over the array 110 of radiating elements 112. As shown, the metasurface 120 may be spaced apart from the array 110, for example using any suitable support substrate.

The metasurface 120 may be made of any suitable metamaterial (e.g., a metal metamaterial thin film). For example, the metasurface 120 may be made of a true-time-delay (TTD) metamaterial, and may be designed to provide a suitable phase distribution over the entire area of the metasurface 120, as discussed below. The metasurface 120 may be a single-polarized metasurface 120, which provides the same phase distribution over two orthogonal wave polarizations (e.g., both vertical and horizontal polarized waves); or a dual-polarized metasurface 120, which provides different phase distribution over two orthogonal wave polarizations (e.g., different between vertical and horizontal polarized waves). A single-polarized metasurface has similar effect on the transmit wave in either vertical or horizontal polarizations, so there is no polarization-dependent effect. In a dual-polarized metasurface, the metasurface has different phase characteristics for two orthogonal polarizations. It should be noted that polarization (i.e., radiation field direction) is not the same as radiation field plane. In the present disclosure, a metasurface is referred to as a single-polarized metasurface if it has the same transmit phase characteristics in the two orthogonal field directions; and a metasurface surface is referred to as a dual-polarized metasurface if it has different phase characteristics in two orthogonal field directions. It should be noted that either a single-polarized or dual-polarized metasurface can be designed to have a same or different phase distribution in the two orthogonal field planes.

In a higher-order sectorized phased array antenna, the beam angle in the azimuthal direction is typically fixed at about ±20° to about ±30°, for example (e.g., for an antenna with fixed azimuth dual-beams). For massive-multiple-input multiple-output (massive-MIMO) applications, the antenna beam may be required to scan over an azimuthal angle range from about ±30° to about ±45°, for example. In a typical base station, it is generally desirable for a phased array antenna to provide down-tilt beam scanning, meaning that the antenna beam should be directed in an elevation angle below the horizon. The elevation angle is typically desired to be at a low range, for example about 1° to about 20° below the horizon. Typically, these desired azimuth and elevation beam angles are achieved by exciting the radiating elements in the phased array antenna using appropriate progressive phases, either in elevation or azimuth plane, or both planes.

Figure 2:
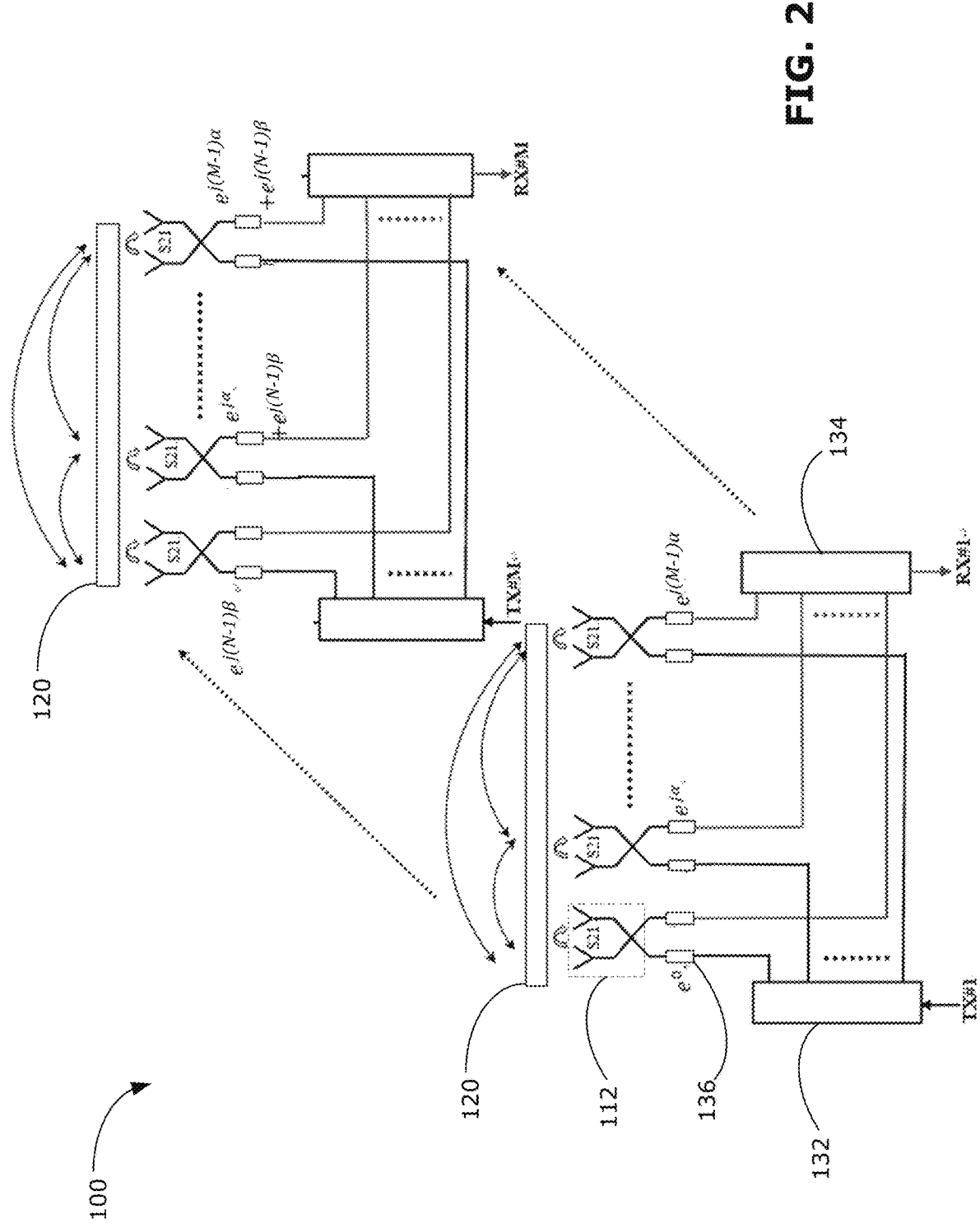
FIG. 2 is a schematic diagram illustrating mutual coupling in an example phased array antenna with dual-polarized radiating elements, as disclosed herein.

FIG. 2 illustrates an example phased array antenna 100 with M rows and N columns, for a total of M×N radiating elements 112. In this example, the radiating elements 112 are dual-polarized radiating elements. Each of the M rows is coupled to a transmit power distribution network 132, numbered as TX #1 to TX #M. The transmit signal is provided from a transmitter (not shown) to the transmit power distribution network 132, to be transmitted via the antenna 100. Each of the M rows is also coupled to a receive power distribution network 134, numbered as RX #1 to RX #M. The receive signal is received by the antenna 100 and provided to a receiver (not shown) via the receive power distribution network 134. The receiver may perform processing on the receive signal, as appropriate. Progressive phases may be applied to the radiating elements 112 via phase shifters 136. The progressive phase applied at each radiating element 112 is represented by exponential functions next to the phase shifters 136 in FIG. 2. In this example, the antenna 100 is excited with progressive phases mα in the azimuth plane and progressive phase nβ in the elevation plane, resulting in a scan angle of θ in the azimuth direction and a scan angle of Ω in the elevation direction. The phase shift applied to the mn-th radiating element 112 (i.e., the radiating element 112 in the m-th row and n-th column) may be expressed as:

$$Az \text{ phase shift} = m\alpha = \left(\frac{2m\pi d}{\lambda}\right)\text{Sin}(\theta)$$

$$El \text{ phase shift} = n\beta = \left(\frac{2n\pi d}{\lambda}\right)\text{Sin}(\Omega)$$

Where Az indicates azimuth, El indicates elevation, d is the distance between adjacent radiating elements, and λ is the center frequency of the antenna 100.

Each radiating element 112 experiences SI, indicated by curved arrows in FIG. 2. S21 indicates cross-polarization coupling between two orthogonal ports within the same radiating element 112. Using high progressive phases (and hence a high degree of scan angle), the total sum of the internally coupled signal between the orthogonally-polarized ports of the phased array antenna 100 can be manipulated to be suppressed, as will be discussed further below. The amount of suppression may be directly proportional to the number of radiating elements 112 in the antenna, as well as the progressive phase applied (which relates to the beam tilt angle of the antenna 100). As will be shown further below, relatively high progressive phases is required to achieve a sufficient suppression of SI. In the antenna 100 disclosed herein, the metasurface 120 introduces a phase offset to the radiation field of the array 110 such that a desired tilt angle for the antenna beam is achieved, for example achieving a lower tilt angle suitable for use in practical applications, such as in a base station.

For clarity, in the context of the present disclosure, the scan angle refers to the angle of the radiation pattern produced by the array 110 of radiating elements 112, due to application of the progressive phases. The antenna beam angle is the angle of the beam with added offset angle due to the added phase distribution introduced by the metasurface 120. That is, the beam angle or antenna beam angle refers to the angle of the radiation pattern outside of the antenna 100, including the effects of the metasurface 120; the scan angle or array angle refers to the angle of the radiation field local to the array and which is of concern for SI, and which does not include the offset angle due to the metasurface 120. The antenna beam angle and the array scan angle thus may be different, and will be discussed below.

Figure 3:
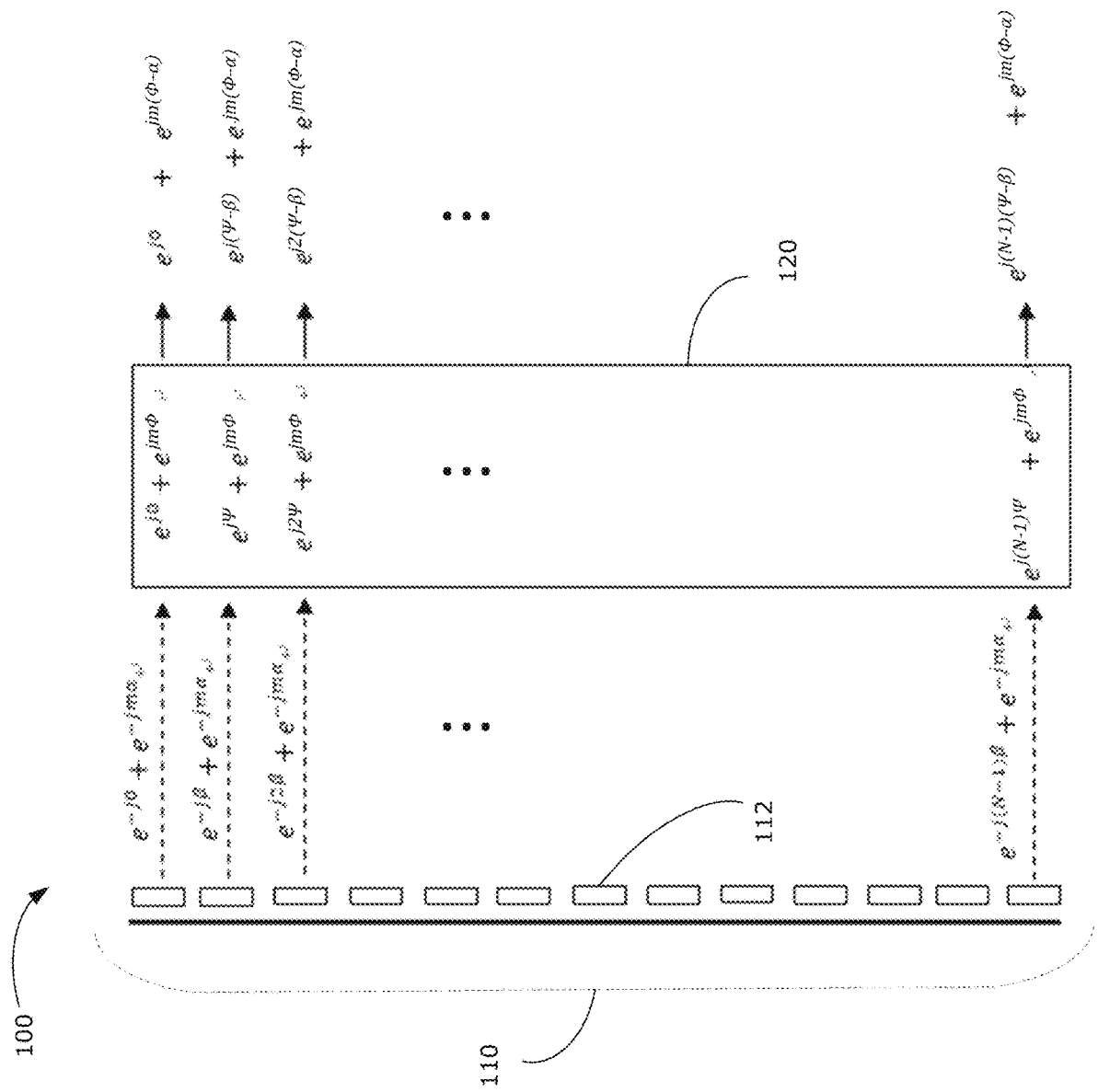
FIG. 3 is a schematic diagram illustrating the angle offset as a result of the metasurface in an example phased array antenna as disclosed herein.

FIG. 3 is a schematic diagram illustrating the effect of the metasurface 120 in the antenna 100. For simplicity, FIG. 3 shows a side view of only the m-th row of the array 110. The metasurface 120 adds a phase shift in the elevation direction, in the azimuth direction, or both elevation and azimuth directions. Generally, the metasurface 120 may be designed to provide any desired added phase, and may be designed to be single-polarized (providing uniform phase distribution in two orthogonal polarizations) or dual-polarized (providing different phase distribution in two orthogonal polarizations). The metasurface 120 may be designed to introduce a phase shift that is pre-selected (e.g., by suitable design of the metasurface 120), or to introduce a phase shift that is selectable (e.g., using a control signal). The metasurface 120 may have a phase distribution that varies along both the elevation and azimuth planes, and the phase distribution may have a similar profile or different profiles along the elevation and azimuth planes.

In the example of FIG. 3, the metasurface 120 introduces a linear phase shift mψ in the azimuth plane and a linear phase shift nφ in the elevation plane, resulting in an offset angle of ξ the azimuth direction and an offset angle of φ in the elevation angle, as represented by the following equations:

$$Az \text{ offset phase shift} = m\Phi = \left(\frac{2m\pi d}{\lambda}\right)\text{Sin}(\xi)$$

$$El \text{ offset phase shift} = n\Psi = \left(\frac{2n\pi d}{\lambda}\right)\text{Sin}(\varphi)$$

With the introduction of the phase shift by the metasurface 120, the radiation field of the array 110 is intentionally offset by an azimuth angle and/or elevation angle. The offset angle introduced by the metasurface 120 may be fixed in the azimuth plane and/or in the elevation plane. In some examples, the metasurface 120 may be controllable (e.g., using a control signal) to control the phase shift and select the desired offset angle. Due to the phase shift (and hence the offset angle) caused by the metasurface 120, higher progressive phases α and β are required to achieve a given desired antenna beam angle. Notably, the local radiation field generated by the array 110, which experiences mutual coupling among internal cross-polarized ports of the radiating elements 112, is not affected by the metasurface 120.

Figure 4:
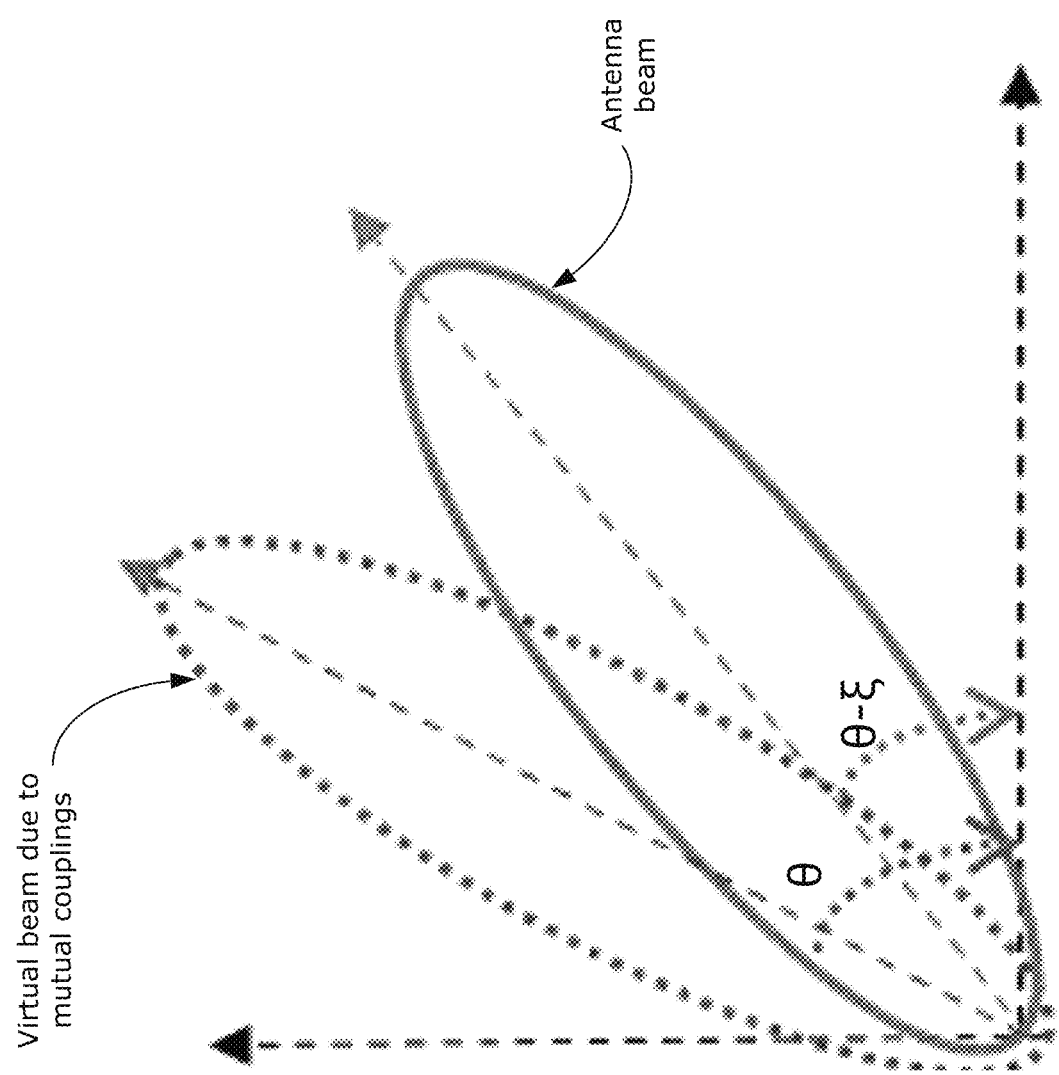
FIG. 4 illustrates the angle offset, between the angle of virtual beam due to the mutual coupling and the angle of the actual antenna beam, as a result of the metasurface in, in an example phased array antenna as disclosed herein.

FIG. 4 illustrates the effect of the metasurface 120, showing only one plane for simplicity. As shown, the virtual beam due to mutual couplings has an angle of θ, however the antenna beam has an angular offset of ξ caused by the metasurface 120. Thus, the antenna beam is at a lower angle than the radiation field generated by the array 110.

Accordingly, the progressive phase applied to the radiating elements 112 (e.g., via phase shifters 136) can be controlled to be high enough to achieve sufficient suppression of SI among the internal cross-polarized ports, and still obtain an antenna beam that is operating at a low beam angle for practical applications. The effect of high progressive phases to cause suppression of mutual coupling is discussed below.

The local transmitted signal at the m-th row and n-th column ($Tx_{mn}$, after passing through the metasurface 120, may be represented by the following equation:

$$Tx_{mn} = \frac{A}{\sqrt{MN}} \cdot e^{-j(m\alpha+n\beta)} \cdot e^{j(m\Phi+n\Psi)} = \frac{A}{\sqrt{MN}} \cdot e^{-jm(\alpha-\Phi)} \cdot e^{-jn(\beta-\Psi)}$$

Where A is the signal amplitude.

The metasurface 120 may be designed such that the phase and delay distribution over the entire area is substantially continuous with less than 180° variation within the effective radiation cone of each radiating element 112. In that case, the radiation pattern of the transmit signal can be approximated using the average local radiation field on the metasurface 120, for example as follows:

$$\text{Total } Tx = \frac{1}{\sqrt{MN}} \sum_{m=0}^{M-1} \sum_{n=0}^{N-1} Tx_{mn} = \frac{A}{MN} \sum_{m=0}^{M-1} \sum_{n=0}^{N-1} e^{-jm(\alpha-\Phi)} \cdot e^{-jn(\beta-\Psi)}$$

$$\text{Total } Tx = A \cdot \left(\frac{1}{M} \sum_{m=0}^{M-1} e^{-jm\alpha} \cdot e^{jm\Phi}\right) \cdot \left(\frac{1}{N} \sum_{n=0}^{N-1} e^{-jn\beta} \cdot e^{jn\Psi}\right)$$

The above equation represents a radiation field pattern with phase shift introduced by the metasurface 120, as discussed above. The total received signal in the cross-polarized channel between the mn-th radiating element (i.e., the radiating element 112 in the m-th row and n-th column) and the pq-th radiating element (i.e., the radiating element 112 in the p-th row and q-th column) may be represented as:

$$V_R^{mn} = \frac{A_{mn}}{\sqrt{MN}} \cdot e^{j(m\alpha+n\beta)} \cdot \left(\sum_{p=0}^{M-1} \sum_{q=0}^{N-1} \frac{A_{pq}}{A_{mn}} \cdot e^{-j(p\alpha+q\beta)} \cdot S_{21}^{mn-pq}\right)$$

Where $S_{21}^{mn-pq}$ is the cross-polarization coupling from the pq-th element to the mn-th element.

The active cross-polarization mutual coupling for the mn-th radiating element may be defined as:

$$\text{Active } S_{21}^{mn} = \sum_{p=0}^{M-1} \sum_{q=0}^{N-1} \frac{A_{pq}}{A_{mn}} \cdot e^{-j(p\alpha+q\beta)} \cdot S_{21}^{mn-pq}$$

Where $A_{mn}$ and $A_{pq}$, are the amplitudes of excitations for the mn-th and pq-th elements, respectively.

Then the active cross-polarization coupling from pq-th element to mn-th element may be expressed as $V_R^{mn}$, where:

$$V_R^{mn} = \frac{A_{mn}}{\sqrt{MN}} e^{-j(m\alpha+n\beta)} \cdot \text{Active}(S_{21}^{mn})$$

The total cross-polarization coupling at any receive port x from all other radiating elements is $MC_x$, where:

$$MC_x = \frac{1}{\sqrt{MN}} \cdot \sum_{m=0}^{M-1} \sum_{n=0}^{N-1} V_R^{mn}$$

Substituting the equation for $V_R^{mn}$:

$$MC_x = \frac{1}{MN} \cdot \sum_{m=0}^{M-1} \sum_{n=0}^{N-1} A_{mn} \cdot e^{-j(m\alpha+n\beta)} \cdot \text{Active}(S_{21}^{mn})$$

For engineering purposes, assuming an infinitely large array 110 of radiating elements 112, the active mutual coupling term can be approximated in terms of mutual couplings from radiating elements located at different numbers of element-spacing. Let $\overline{S}_{21}$ be defined as the average cross-polarization coupling between two orthogonal ports within the same radiating element; let $1^{st}$ order mutual couplings be defined as mutual couplings resulting from immediately adjacent radiating elements; let $2^{nd}$ order couplings be defined as mutual couplings resulting from radiating elements spaced one element away; and so forth. Then the total mutual coupling experienced at receive port x has the magnitude:

$$|MC_x| = \frac{\text{Sin}(M\alpha)}{M\text{Sin}(\alpha)} \cdot \frac{\text{Sin}(N\beta)}{N\text{Sin}(\beta)} \cdot$$

$$(\overline{S}_{21} + 1st \text{ order } MC + 2nd \text{ order } MC + \ldots + \text{higher order } MC)$$

For the purpose of order-of-magnitude estimation, a 2nd-order approximation of the cross-polarization mutual coupling can be made using a sub-array model, such that:

$$|MC_x|(dB) \approx \left(20\text{Log}\left(\frac{\text{Sin}(M\alpha)}{M\text{Sin}(\alpha)}\right) + 20\text{Log}\left(\frac{\text{Sin}(N\beta)}{N\text{Sin}(\beta)}\right) + \right.$$

$$20\text{Log}(\overline{S}_{21} + 1st \text{ order } \overline{MC} + 2nd \text{ order } \overline{MC})$$

Where the $1^{st}$ and $2^{nd}$ order mutual coupling terms can be approximated by:

$$2\text{Cos}(\alpha) \cdot S_{21}^{mn-(m\pm1)n} + 2\text{Cos}(\beta) \cdot S_{21}^{mn-m(n\pm1)} + 4\text{Cos}(\alpha+\beta) \cdot S_{21}^{mn-(m\pm1)(n\pm1)} +$$

$$2\text{Cos}(2\alpha)S_{21}^{mn-(m\pm2)n} + 2\text{Cos}(2\beta)S_{21}^{mn-m(n\pm2)} + 4\text{Cos}(2\alpha+\beta)S_{21}^{mn-(m\pm2)(n\pm1)} +$$

$$4\text{Cos}(\alpha+2\beta)S_{21}^{mn-(m\pm1)(n\pm2)} + 4\text{Cos}(2\alpha+2\beta)S_{21}^{mn-(m\pm2)(n\pm2)}$$

As demonstrated by the above equation, the amplitude factor of the cross-polarization mutual coupling (MC) contains two Sin(x)/x factors as a function of the elevation progressive phase β and the azimuth progressive phase α. Example simulated amplitude factors vs. different degrees of progressive phases, for different M rows of radiating elements (assuming a single column) are plotted on FIGS. 5A and 5B. It should be noted that the plots show different trends depending on whether the number of radiating elements M is odd (as in FIG. 5A) or even (as in FIG. 5B). It should also be noted that as M increases, the amplitude factor for cross-polarization mutual coupling decreases.

Figure 5A:
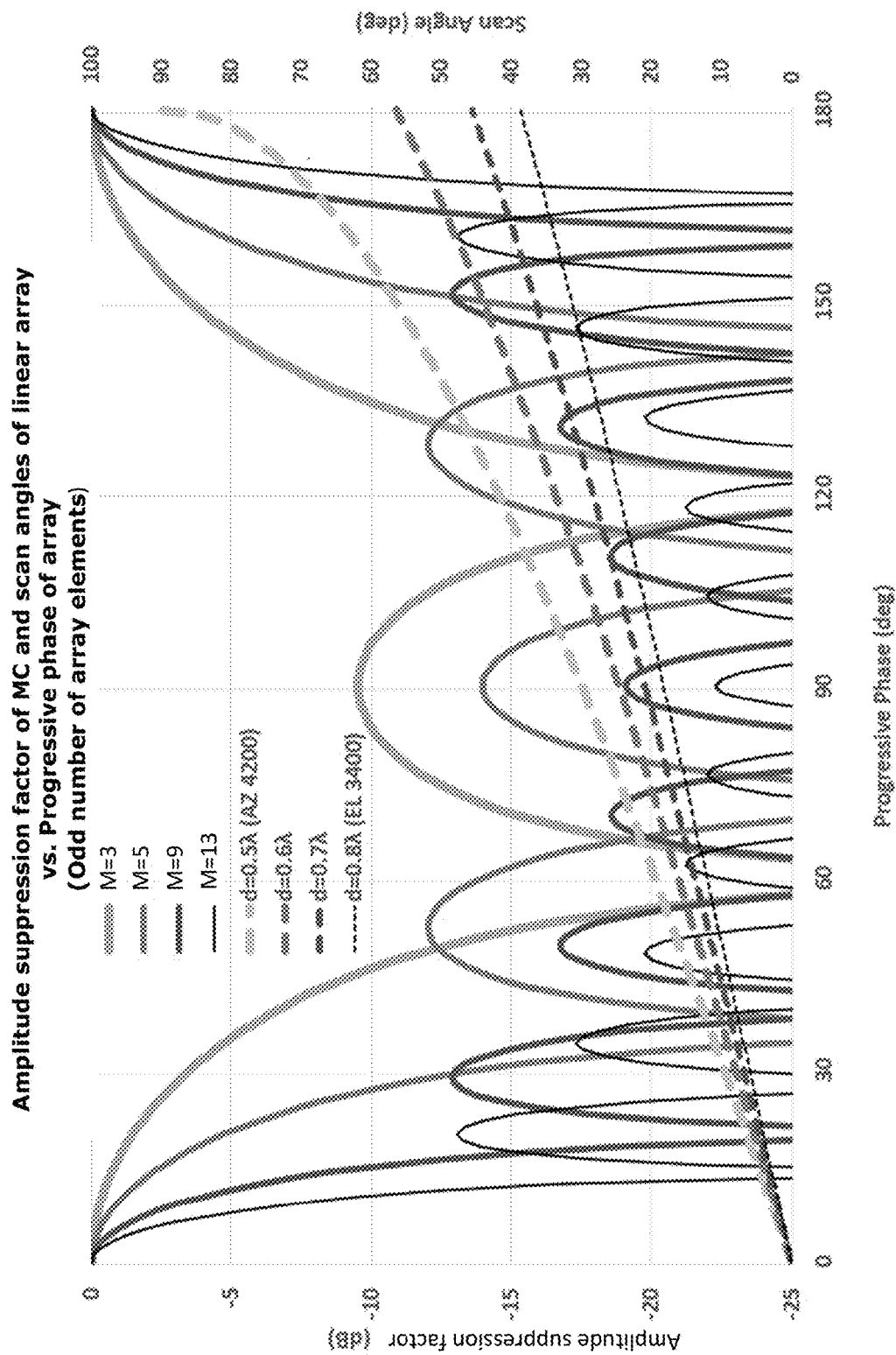
FIGS. 5A and 5B are plots of amplitude suppression factor vs. progressive phase, and scan angle vs. progressive phase, for examples of the disclosed phased array antenna having different numbers of radiating elements and having different spacing between radiating elements.
Figure 5B:
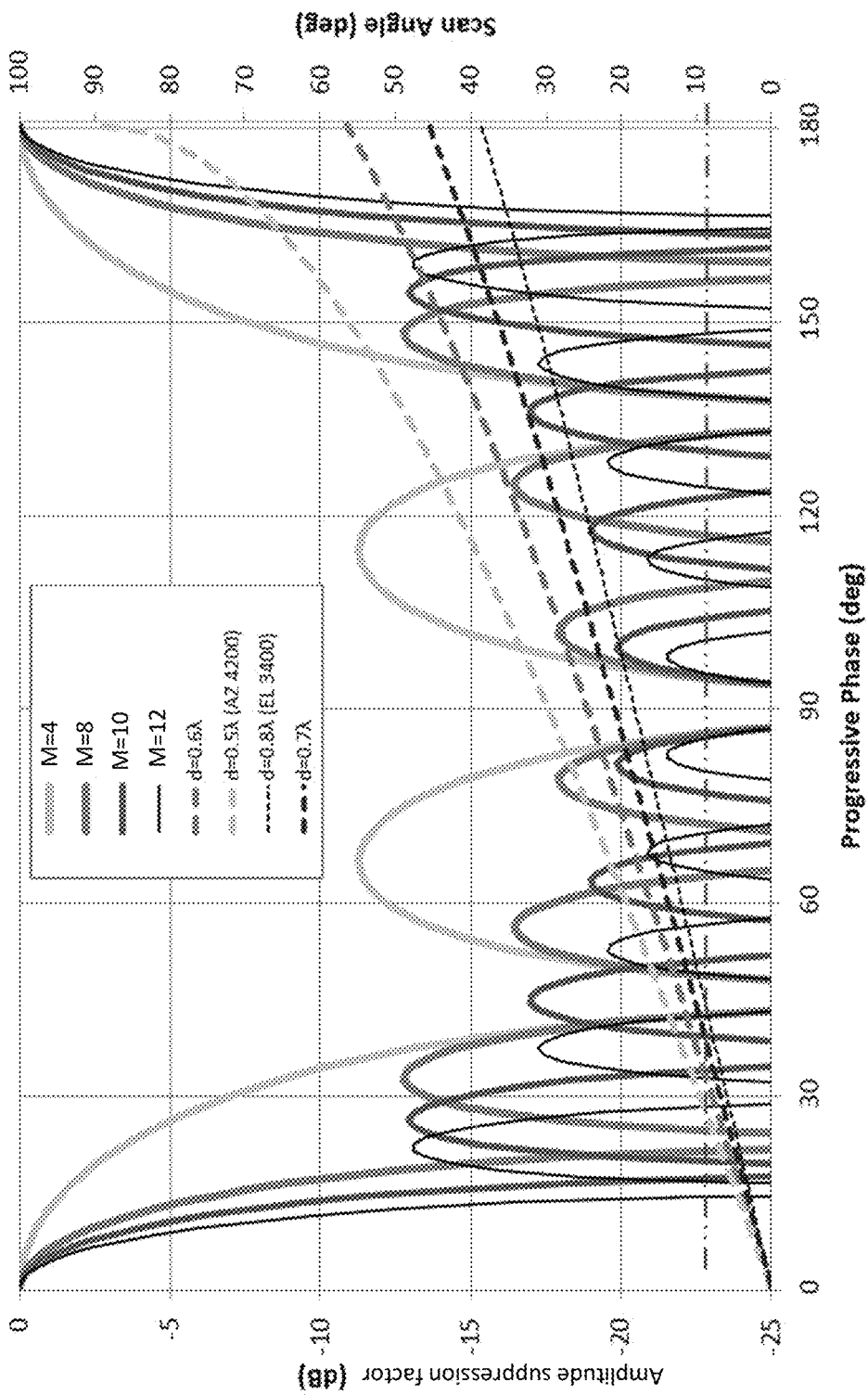

FIG. 5B demonstrates that, for an array having an even number of radiating elements, mutual coupling can be significantly suppressed or cancelled when the progressive phase is about 90°. For a higher number of radiating elements (e.g., 14 or more), the amplitude factor for cross-polarization mutual coupling can be suppressed by over 20 dB or when the progressive phase is in the range of about 60° to about 120°. FIG. 5A shows that mutual coupling can be significantly suppressed for an array having an odd number of radiating elements at other similarly high progressive phases (e.g., at around 60° and around 120° in the case of an array of three radiating elements).

FIGS. 5A and 5B also include plots of the scan angles of these linear arrays vs. different degrees of progressive phases, for different spacing d between radiating elements (normalized to the center frequency λ), and without the offset angle introduced by the metasurface. It should be noted that different spacing d may be used for different center frequencies. Using such plots or simulations, it is possible to determine the progressive phase(s) (e.g., in both azimuth and elevation planes) to apply to the array of radiating elements, in order to achieve a desired amount of suppression. The selected progressive phase(s) will cause the array to have certain scan angle(s) in the corresponding azimuth and/or elevation planes. The metasurface may then be designed or selected to introduce the necessary amount of phase shift (e.g., in the elevation direction and/or the azimuth direction), in order to cause the offset angle necessary to achieve a desired beam angle for the overall antenna.

Figure 6:
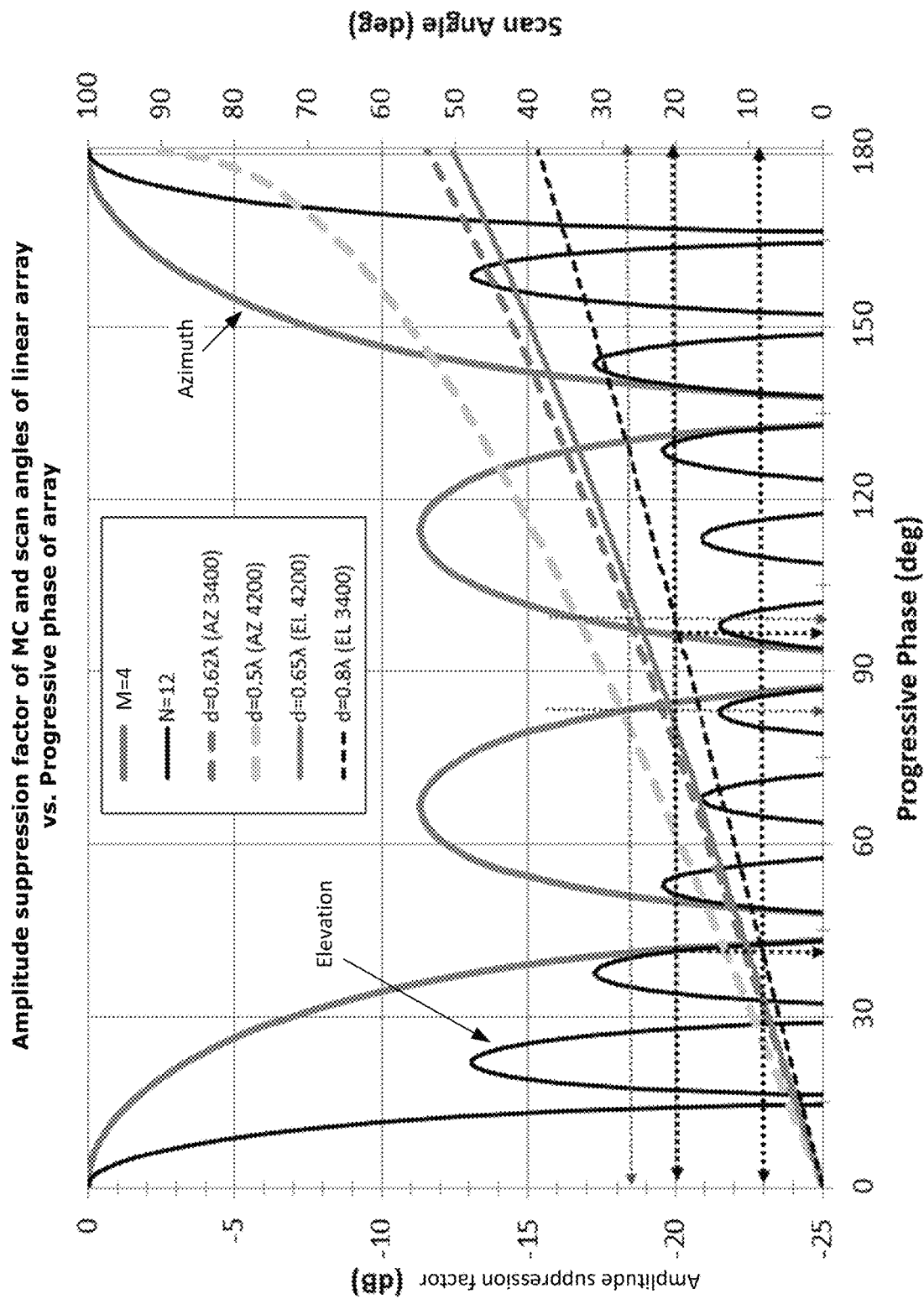
FIG. 6 is a plot showing simulated amplitude suppression factor results for an example 4×12 six-sector phased array antenna, in accordance with an example of the present disclosure.

FIG. 6 is a plot showing simulation results for an example of the disclosed antenna, having a 4×12 array of radiating elements. The antenna in this example is a six-sector phased array dual-beam antenna. In this case, for a center frequency of 3800 MHz (indicated in FIG. 6 as Az 3800 and El 3800), the 12 rows of elevation radiating elements have a separation of d=0.72λ between elements; and the 4 columns of azimuth radiating elements have a separation of d=0.56λ between elements. FIG. 6 shows plots for the radiation pattern of the array in the azimuth plane and in the elevation plane, as indicated. In this example, the radiation pattern in the azimuth plane was found to have a wider beam width than the radiation pattern in the elevation plane. The sidelobe amplitude levels were found to be smaller in the elevation plane, compared to the azimuth plane.

In this simulation, the metasurface was designed to cause an offset angle of 7° in the elevation direction. Thus, a down-tilt of 13° in the progressive phase is required to achieve an antenna beam having an actual down-tilt of 6°. This corresponds to a progressive phase of −60° in the elevation plane. To achieve a fixed +/−27° azimuth angle for the bi-sector dual antenna beams, the progressive phase in the azimuth angle is selected to be about −90°.

Table I is a summary of the 1$^{st}$ order cross-polarization mutual coupling in this example case study:

| Parameter | Min (deg) | Max (deg) |
|---|---|---|
| Az progressive phase | −90 | −90 |
| El progressive phase | −40 | −70 |

| Parameter | Min (dB) | Max (dB) |
|---|---|---|
| 2nd order mutual coupling | −36.1 | −22 |
| El array suppression | −20 | −20 |
| Az array suppression | −18 | −18 |
| Total cross-polarization suppression between TX/RX ports | −74.1 | −60 |

As shown in FIG. 6 and outlined in Table I, in an example operation where the center frequency is 3800 MHz, the progressive phase in the azimuth plane may be fixed at 90°, where the mutual coupling in the azimuth plane is completely suppressed, and where the resulting array scan angle is about 27°. The progressive phase in the elevation phase may be varied from about 40° to about 70°, resulting in an array scan angle from about 10° to about 20°. When the metasurface is selected to introduce an offset angle of 7° in the elevation direction, the resulting overall antenna beam angle is about 3° to about 13° in the elevation plane, which may be practical for base station applications, for example. For this range of progressive phases in the elevation plane, it was found that the total cross-polarization suppression (including suppression in both elevation and azimuth planes) between transmit and receive ports is in the range of about 60 dB to about 74 dB. To bring the SI suppression to be below the thermal noise floor (e.g., 100 dB suppression), only a single cancellation stage may be required in the receiver. Using only one cancellation stage in the receiver (compared to two or three stages when using conventional antennas) may help to avoid saturation of the signal, and may also help to reduce the complexity and/or costs of the receiver.

FIG. 6 also plots scan angle vs. progressive phase for center frequencies of 3400 MHz (indicated as Az 3400 and El 3400) and 4200 MHz (indicated as Az 4200 and El 4200). Within this approximately 20% bandwidth range, an elevation scan range of about 8° to about 20° was found to be achievable with suppression of mutual coupling. With an offset angle of 7° introduced by the metasurface, the resulting elevation angle of the antenna beam is in the range of about 1° to about 13°. These plots illustrate that an acceptable beam angle may be achieved with significant suppression of SI, over a 20% bandwidth, using the disclosed antenna design. This performance has also been verified using a full-wave array model.

In some examples, the disclosed antenna may be implemented using single-polarized radiating elements. When using single-polarized radiating elements, circulators may be added for each transmission port.

Figure 7:
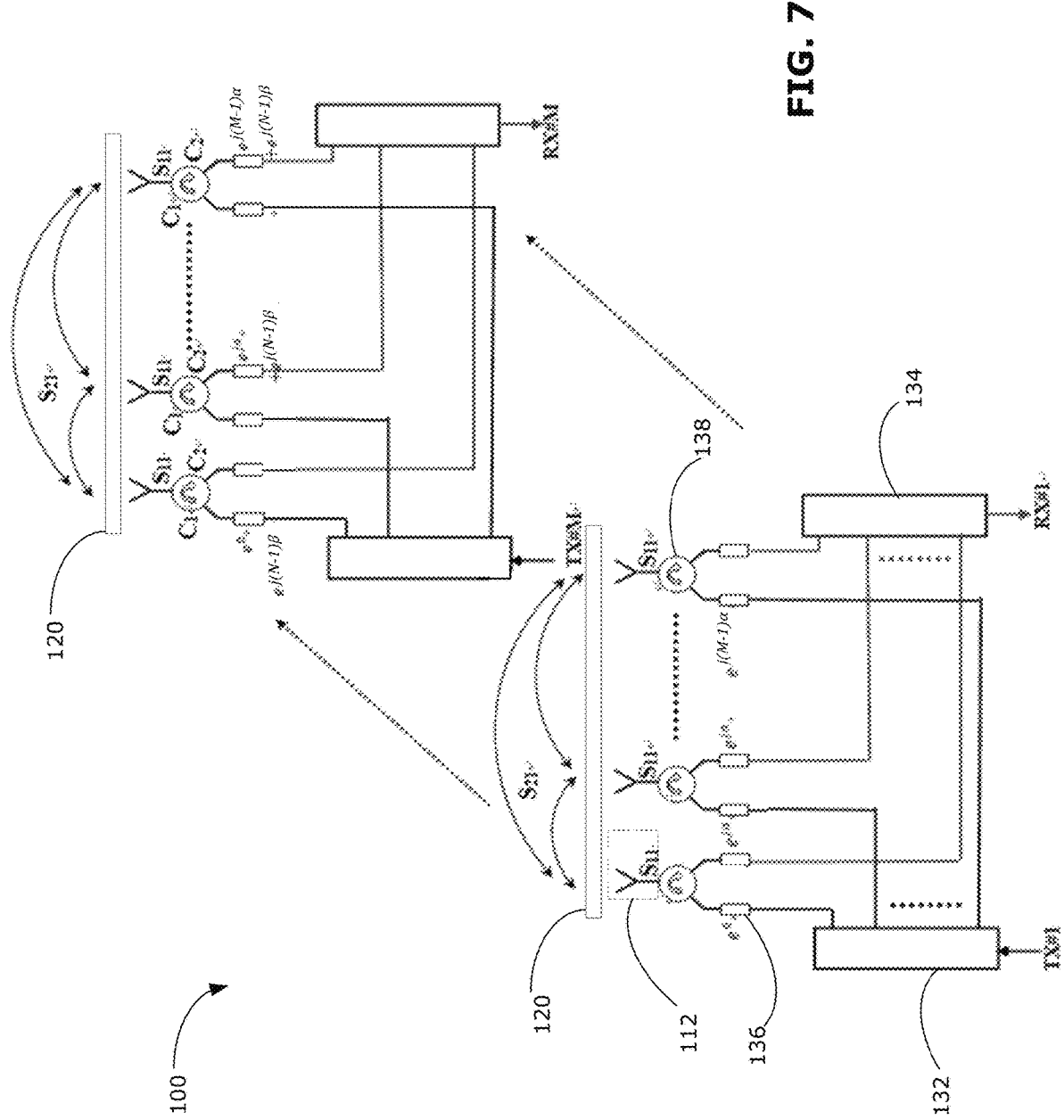
FIG. 7 is a schematic diagram illustrating mutual coupling in an example phased array antenna with single-polarized radiating elements, as disclosed herein.

FIG. 7 illustrates an example of the disclosed phased array antenna 100 with M×N single-polarized radiating elements 112. Similar to the antenna 100 of FIG. 2, each of the M rows is coupled to a transmit power distribution network 132, numbered as TX #1 to TX #M. The transmit signal is provided from a transmitter (not shown) to the transmit power distribution network 132, to be transmitted via the antenna 100. Each of the M rows is also coupled to a receive power distribution network 134, numbered as RX #1 to RX #M. The receive signal is received by the antenna 100 and provided to a receiver (not shown) via the receive power distribution network 134. Progressive phases may be applied to the radiating elements 112 via the phase shifters 136. The progressive phase applied at each radiating element 112 is represented by exponential functions next to the phase shifters 136 in FIG. 7. The antenna 100 includes a circulator 138 (e.g., a three-port circulator) for each radiating element 112, to control whether the transmit power distribution network 132 or the receive power distribution network 134 communicates a signal with the radiating element 112.

An advantage of using single-polarized radiating elements is that transmit and receive signals travel the same signal path, so the channel characteristics are the same for both transmit and receive signals. Such an implementation may be desirable for massive-MIMO applications. In some cases, the antenna 100 of FIG. 7 may be expected to have slightly lower in-band carrier suppression as compared to antenna 100 of FIG. 2, due to higher leakage from co-polar radiating elements 112.

Each radiating element 112 experiences SI, indicated by curved arrows in FIG. 7. S11 indicates antenna input reflection within a radiating element 112. The total received signal is a sum of internal leakage and reflections from the mn-th radiating element, and mutual couplings from all other radiating elements (indicated by pq notation in the equations below). The received power at the mn-th radiating element, $V_R^{mn}$, may be represented by the following equation:

$$V_R^{mn} = \frac{A_{mn}}{\sqrt{MN}} e^{-j(m\alpha+n\beta)} \cdot \left( C_3^{mn} + C_1 S_{11}^{mn} C_2 + \sum_{p=0}^{M-1}\sum_{q=0}^{N-1} \frac{A_{pq}}{A_{mn}} \cdot e^{-j(p\alpha+q\beta)} \cdot S_{21}^{mn-pq} \right)$$

Where $C_1$, $C_2$, and $C_3$ are transmission coefficients of the three-port circulator 138, and $S_{21}^{mn-pq}$ is the co-polar mutual coupling from the pq-th radiating element to the mn-th radiating element. The active co-polar coupling for the mn-th radiating element may be defined as:

$$\text{Active}(S_{21}^{mn}) = \sum_{p=0}^{M-1}\sum_{q=0}^{N-1} \frac{A_{pq}}{A_{mn}} \cdot e^{-j(p\alpha+q\beta)} \cdot S_{21}^{mn-pq}$$

Assuming identical circulators are used for all radiating elements, the active mutual coupling from the pq-th radiating element to the mn-th radiating element may be expressed as:

$$V_R^{mn} = \frac{A_{mn}}{\sqrt{MN}} e^{-j(m\alpha+n\beta)} \cdot (C_3 + C_1 S_{11}^{mn} C_2 + \text{Active}(S_{21}^{mn}))$$

The total mutual coupling at receive inputs of the phased array antenna, from all ports, may be expressed as:

$$Rx_{co} = \frac{1}{\sqrt{MN}} \sum_{m=0}^{M-1}\sum_{n=0}^{N-1} V_R^{mn}$$

Substituting the equation for $V_R^{mn}$, the expression becomes:

$$Rx_{co} = \frac{1}{MN} \sum_{m=0}^{M-1}\sum_{n=0}^{N-1} A_{mn} \cdot e^{-j(m\alpha+n\beta)} \cdot (C_3 + C_1 S_{11}^{mn} C_2 + \text{Active}(S_{21}^{mn}))$$

For a substantially uniform phased array, $A_{mn}=1$. With the application of progressive phase excitations, the active mutual coupling factor is approximately constant across the aperture. Thus, $(S_{11}^{mn}) \approx (\overline{S}_{11})$, and $\text{Active}(S_{21}^{mn}) \approx \text{Active}(\overline{S}_{21})$, where $\text{Active}(\overline{S}_{21})$ is the average active coupling factor. The expression for $Rx_{co}$ then may be written as:

$$Rx_{co} = \frac{1}{MN} \cdot \left(\sum_{m=0}^{M-1} e^{-jm\alpha}\right)\left(\sum_{n=0}^{N-1} e^{-jn\beta}\right) \cdot (C_3 + C_1 \overline{S}_{11} C_2 + \text{Active}(\overline{S}_{21}))$$

$$Rx_{co} = \frac{1}{MN} \cdot e^{-j[(M-1)\alpha+(N-1)\beta]} \cdot$$
$$\frac{\text{Sin}(M\alpha)}{M\text{Sin}(\alpha)} \cdot \frac{\text{Sin}(N\beta)}{N\text{Sin}(\beta)} \cdot (C_3 + C_1 \overline{S}_{11} C_2 + \text{Active}(\overline{S}_{21}))$$

The active mutual coupling term $\text{Active}(\overline{S}_{21})$ may be approximated in terms of mutual couplings from radiating elements located at different numbers of element-spacing. Let $\overline{S}_{21}$ be defined as the average co-polarization coupling within the same radiating element; let $1^{st}$ order mutual couplings be defined as mutual couplings resulting from immediately adjacent radiating elements; let $2^{nd}$ order couplings be defined as mutual couplings resulting from radiating elements spaced one element away; and so forth. Then, the total mutual coupling for a uniform array with progressive phase excitation can be approximated as:

$$|Rx_{co}| = \frac{\text{Sin}(M\alpha)}{M\text{Sin}(\alpha)} \cdot \frac{\text{Sin}(N\beta)}{N\text{Sin}(\beta)} \cdot (C_3 + C_1 \overline{S}_{11} C_2 +$$
$$1st \text{ order } MC + 2nd \text{ order } MC + \ldots + \text{higher order } MC)$$

For the purpose of order-of-magnitude estimation, a 2nd-order approximation of the cross-polarization mutual coupling can be made using a sub-array model, such that:

$$|Rx_{co}|(dB) \approx \left(20\text{Log}\left(\frac{\text{Sin}(M\alpha)}{M\text{Sin}(\alpha)}\right) + 20\text{Log}\left(\frac{\text{Sin}(N\beta)}{N\text{Sin}(\beta)}\right)\right) +$$
$$20\text{Log}(C_3 + C_1 \overline{S}_{11} C_2 + 1st \text{ order } \overline{MC} + 2nd \text{ order } \overline{MC})$$

Where the $1^{st}$ and $2^{nd}$ order mutual couplings can be approximated by:

$$2\text{Cos}(\alpha) \cdot S_{21}^{mn-(m\pm1)n} + 2\text{Cos}(\beta) \cdot S_{21}^{mn-m(n\pm1)} + 4\text{Cos}(\alpha+\beta) \cdot S_{21}^{mn-(m\pm1)(n\pm1)} +$$
$$2\text{Cos}(2\alpha) S_{21}^{mn-(m\pm2)n} + 2\text{Cos}(2\beta) S_{21}^{mn-m(n\pm2)} + 4\text{Cos}(2\alpha+\beta) S_{21}^{mn-(m\pm2)(n\pm1)} +$$
$$4\text{Cos}(\alpha+2\beta) S_{21}^{mn-(m\pm1)(n\pm2)} + 4\text{Cos}(2\alpha+2\beta) S_{21}^{mn-(m\pm2)(n\pm2)}$$

This is similar to the result discussed above for the example antenna 100 of FIG. 2, using dual-polarized radiating elements. However, the total suppression in the case of the example antenna 100 having single-polarized radiating elements is expected to be lower because the first term of the expression, involving S11, is typically higher than the cross-polarization term S21 in the case of dual-polarized radiating elements. Furthermore, the mutual coupling term in the case of single-polarized radiating elements is also expected to be higher because the mutual coupling due to co-polar radiation is typically higher than that of a cross-polar radiation field. Implementation using single-polarized radiating elements may tend to result in lower transmit-receive port isolation, compared to implementation using dual-polarized radiating elements. However, the total SI suppression may be improved by using a larger number of radiating elements in a column of the array.

Figure 8:
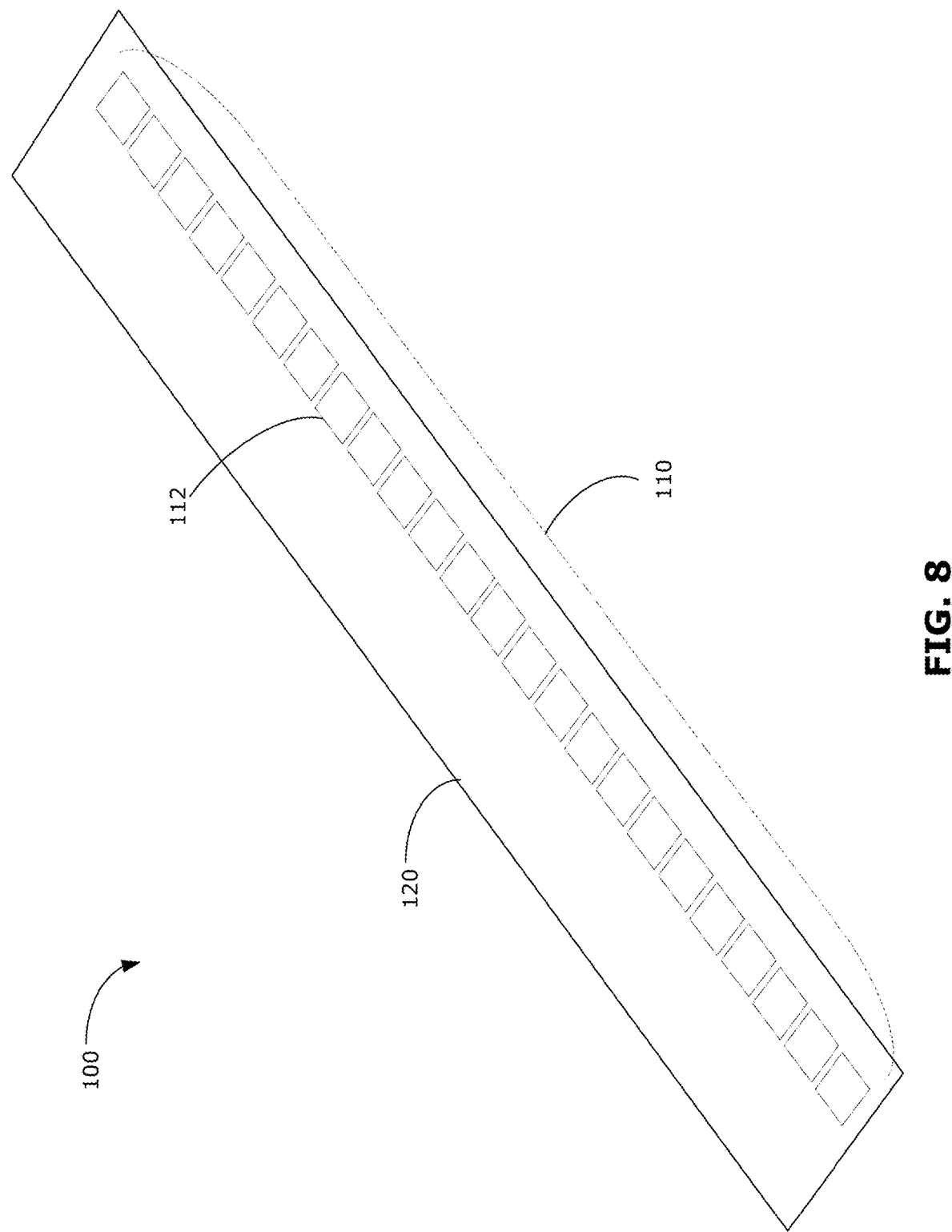
FIG. 8 shows a perspective view of an example single-column phased array antenna as disclosed herein.

FIG. 8 shows an example phased array antenna 100 as disclosed herein. In this example, the array 110 of radiating elements 112 includes only a single column. Generally, a single column configuration may be considered a standard configuration for current base station phased array antennas, for 65° and 90° azimuth coverage angles. A large number of radiating elements 112 (e.g., 24 radiating elements 112 in the example shown) may be used. The larger number (e.g., 12 or more) of radiating elements 112 in the single column array 110, compared to the number of radiating elements 112 in one column of a multi-column array 110 (e.g., in the example of FIG. 1A), may help to achieve a desired amount of SI suppression.

In some examples, the phased array antenna 100 of FIG. 7 may be designed for use in massive-MIMO communications. In such an application, the scanning of the antenna beam in both elevation and azimuth directions is desired. A dual-polarized metasurface 120 may be used to introduce different offset angles for scanning in different azimuth sectors.

FIGS. 9A and 9B illustrate an example of phase shift that may be introduced by the dual-polarized metasurface 120, in the azimuth plane, for two orthogonal polarizations. The phase shift introduced by the metasurface 120 in the elevation plane may be linear, similar to that described for the example antenna of FIG. 2, to cause a substantially constant offset angle in the elevation plane. As shown in FIG. 9A, in one polarization (e.g., for horizontally polarized waves), when the azimuth beam angle is relatively large (e.g., azimuth angle of more than ±10°) the metasurface 120 introduces no phase offset or a constant phase offset. The result is that no offset angle is added to the antenna beam. As shown in FIG. 9B, in the second polarization (e.g., for vertically polarized waves), the metasurface 120 may be designed to produce a varying phase offset, having a rooftop profile, to allow the antenna beam to cover the broadside angle (e.g., azimuth angle of less than ±10°). A rooftop profile in this case may refer to a phase shift profile, along one axis (e.g., longitudinal axis of the single column array 110), in which the phase shift introduced by the metasurface 120 steadily increases (e.g., at a constant rate) from opposite ends of the metasurface 120 along the axis and has a maximum phase shift near the middle of the metasurface 120 along the axis. In FIG. 9B, the phase shift profile is shown as being substantially symmetrical. The use of a symmetrical rooftop profile may help to achieve a more symmetrical beam shape when the beam is at a lower azimuth tilt angle. A symmetrical profile may provide a better beam shape (e.g., more symmetrical beam shape) for a radiation pattern at a lower azimuth angle (e.g., less than ±10°). An asymmetrical profile may cause undesirable characteristics in the radiation pattern, such as higher sidelobe level on one side, or reduced amplitude suppression. However, in some implementations, such undesirable characteristics may be considered acceptable. In some examples, the rooftop profile may be an off-center rooftop profile, such that the maximum phase shift is off-center from the middle of the metasurface 120 along the axis.

In some cases, a rooftop profile may not be needed, and the metasurface 120 may introduce phase shift having a linear phase distribution instead. Such a design may be suitable where higher sidelobe amplitudes may be of less concern.

In the example described above, the antenna 100 is implemented using single-polarized radiating elements 112 and circulators 138. In some examples, the antenna 100 may be implemented using dual-polarized radiating elements 112 and still include the use of circulators 138. This may enable an increase in capacity, for example up to twice the capacity when compared to the example antenna 100 of FIG. 2. In some examples, circulators may also be used where the antenna is implemented using dual-polarized radiating elements. Use of a circulator for each polarization in a dual-polarized radiating element (i.e., each dual-polarized radiating element is provided with two circulators, one for each polarization) may be expected to increase the capacity by two, possibly at the expense of reduced suppression of mutual coupling (as well as possible increase in cost and/or complexity). Such an embodiment, using circulators with dual-polarized radiating elements, may be useful for massive-MIMO applications, to achieve a higher or maximum capacity.

By using a larger number of radiating elements 112 in a column in the array 110, mutual coupling may be kept sufficiently low. The use of circulators 138 may enable a radiating element 112 to use the same radiator (e.g., radiating patch, in the case of a patch radiating element) for both transmit and receive, thus providing the same channel characteristics for both transmit and receive channels. This may be useful for applications such as massive-MIMO.

In some examples, the present disclosure describes a phased array antenna having a multi-column array of dual-polarized radiating elements, with smaller number of radiating elements per column, with a single-polarized metasurface. In some examples, the present disclosure describes a phased array antenna having a single-column array of single-polarized radiating elements, with larger number of radiating elements per column, with a dual-polarized metasurface. It should be understood that, in other examples, features may be combined. For instance, an example of the disclosed phased array antenna may include a multi-column array of single-polarized radiating elements, with larger number of radiating elements per column, with a single-polarized metasurface; another example of the disclosed phased array antenna may include a single-column array of dual-polarized radiating elements, with smaller number of radiating elements per column, with a dual-polarized metasurface. It will be appreciated that the phased array antenna may be designed with different features, to suit different applications and different operating requirements.

Examples of the disclosed antenna may be implemented in a wireless communication device, for example a base station. In some applications, a base station may also be referred to as an access point, a router, or an eNodeB, among others. The disclosed antenna may enable the use of full-duplex communications in a wireless network, for example in a 5G communications network. For example, the disclosed phased array antenna may be implemented as a high-order sectorized multi-column base station, as a high-gain base station array antenna (e.g., having a single column phased array), or as a multi-column MIMO array antenna, among other examples.

Figure 10:
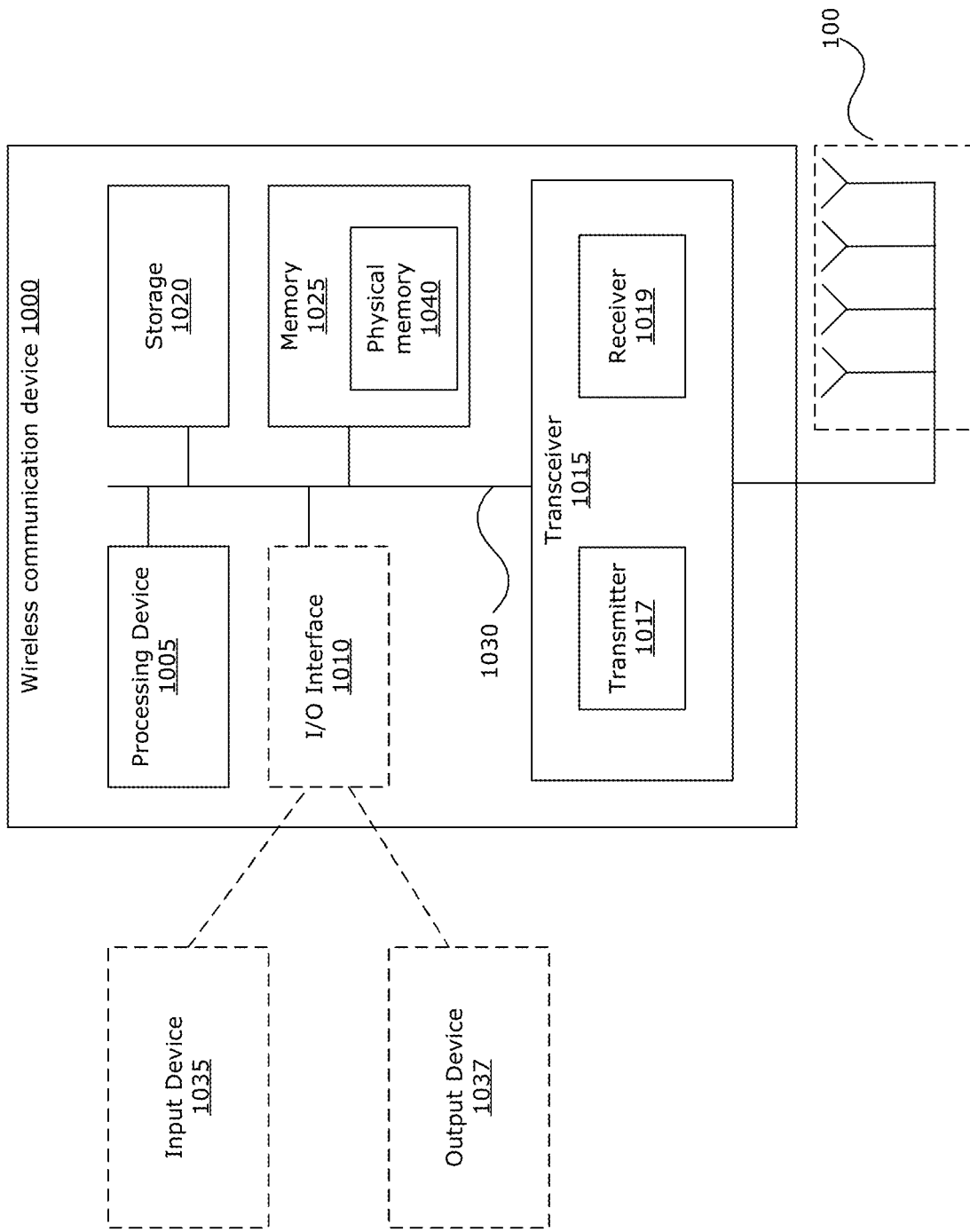
FIG. 10 is a schematic diagram of an example wireless communication device, in which an example of the disclosed phased array antenna may be implemented.

FIG. 10 is a schematic diagram of an example wireless communication device, in which an example of the disclosed phased array antenna may be implemented.

Various examples of the disclosed phased array antenna may be implemented in different wireless communication devices, as mentioned above. FIG. 10 is a schematic diagram of an example wireless communication device 1000, in which examples of the phased array antenna 100 described herein may be used. One or more examples of the phased array antennas 100 described herein may be implemented as a single column or multi-column array in the wireless communication device 1000. For example, the wireless communication device 1000 may be a base station in a wireless communication network. The wireless communication device 1000 may be used for communications within 5G communication networks or other wireless communication networks, and may be used for full-duplex communications (i.e., where transmission and reception signals use the same time-frequency resources). Although FIG. 10 shows a single instance of each component, there may be multiple instances of each component in the wireless communication device 1000. The wireless communication device 1000 may be implemented using parallel and/or distributed architecture.

The wireless communication device 1000 may include one or more processing devices 1005, such as a processor, a microprocessor, an application-specific integrated circuit (ASIC), a field-programmable gate array (FPGA), a dedicated logic circuitry, or combinations thereof. The wireless communication device 1000 may also include one or more optional input/output (I/O) interfaces 1010, which may enable interfacing with one or more optional input devices 1035 and/or output devices 1037. The wireless communication device 1000 may include a transceiver 1015 for wired or wireless communication with a network (e.g., an intranet, the Internet, a P2P network, a WAN and/or a LAN, and/or a Radio Access Network (RAN)) or other node. In some examples, the wireless communication device 1000 may include one or more other interfaces (not shown) to wired networks. Wired networks may make use of wired links (e.g., Ethernet cable). The transceiver 1015 may enable wireless communication (e.g., full-duplex communications) via an example of the disclosed phased array antenna 100. The transceiver 1015 includes a transmitter 1017 and a receiver 1019. In some examples, instead of the transceiver 1015 that includes both the transmitter 1017 and the receiver 1019, a transmitter and a receiver may be implemented as separate components in the wireless communication device 1000.

The transmitter 1017 provides a transmit signal to be transmitted via the antenna 100. For example, the transmitter 1017 may provide the transmit signal to a transmit power distribution network of the antenna 100. The receiver 1019 receives a receive signal via the antenna 100. For the example, the receiver 1019 may receive the receive signal via a receive power distribution network 134. The receiver 1019 may include one or more stages for processing the receive signal. For example, the receiver 1019 may include a single cancellation stage (not shown), for performing interference cancellation or suppression (e.g., including providing additional suppression of SI).

The wireless communication device 1000 may include one or more storage units 1020, which may include a mass storage unit such as a solid state drive, a hard disk drive, a magnetic disk drive and/or an optical disk drive. The wireless communication device 1000 may also include one or more memories 1025 that can include a physical memory 1040, which may include a volatile or non-volatile memory (e.g., a flash memory, a random access memory (RAM), and/or a read-only memory (ROM)). The non-transitory memory(ies) 1025 (as well as the storage 1020) may store instructions for execution by the processing device(s) 1005. The memory(ies) 1025 may include other software instructions, such as for implementing an operating system (OS), and other applications/functions. In some examples, one or more data sets and/or modules may be provided by an external memory (e.g., an external drive in wired or wireless communication with the wireless communication device 1000) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 1030 providing communication among components of the wireless communication device 1000. The bus 1030 may be any suitable bus architecture including, for example, a memory bus, a peripheral bus or a video bus. Optional input device(s) 1035 (e.g., a keyboard, a mouse, a microphone, a touchscreen, and/or a keypad) and optional output device(s) 1037 (e.g., a display, a speaker and/or a printer) are shown as external to the wireless communication device 1000, and connected to optional I/O interface 1010. In other examples, one or more of the input device(s) 1035 and/or the output device(s) 1037 may be included as a component of the wireless communication device 1000.

The processing device(s) 1005 may also be used to communicate transmit/receive signals to/from the transceiver 1015, and may also be used to control the progressive phases applied in the phased array antenna 100. Where the metasurface in the antenna 100 has a controllable phase shift distribution, the processing device(s) 1005 may be used to control the phase shift distribution of the metasurface.

In some examples, the present disclosure describes a phased array antenna suitable for full-duplex communications, including for massive-MIMO communications such as in 5G networks. The disclosed full-duplex phased array antenna may, in various examples, use a plurality of dual-polarized or single-polarized radiating elements arranged in a single column or multiple column array, and include with a metasurface to introduce a phase shift. The metasurface may be single-polarized or dual-polarized.

Inclusion of the metasurface in the disclosed phased array antenna may enable cancellation or suppression of internal mutual couplings, and at the same time achieve an antenna beam angle that is of practical use. The inclusion of the metasurface in the disclosed antenna may also provide other advantages. For example, the use of a metasurface may allow for beam overlap over the metasurface, which may help to address the issue of grating lobe.

Some examples of the disclosed antenna use dual-polarized radiating elements in the phased array antenna, for example dual-polarized radiating elements having high polarization orthogonality, such as described in U.S. patent application Ser. No. 16/039,853. Such example antennas may be suitable for smaller phased array antennas, having smaller numbers of columns in the azimuth direction, for example as a higher-order sectorized antenna array. Simulations have found that such example antennas may achieve transmit-to-receive leakage suppression in the range of about 60 dB to about 70 dB, for a relatively low elevation beam angle over a 10° scan range (e.g., from about 3° to about 13°).

Various examples of the disclosed antenna array may be suitable for use in broadband, full-duplex communications, and may be used in beam-steerable phased array architecture.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure. For examples, although certain sizes and shapes of the disclosed antenna have been shown, other sizes and shapes may be used.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A beam-steerable phased array antenna comprising:
an array of a plurality of dual-polarized radiating elements, the array including at least one column having a plurality of dual-polarized radiating elements, the array being configured to generate a radiation field; and
a metasurface over the array of radiating elements, the metasurface introducing a phase distribution over at least one wave polarization direction to cause a phase shift to the radiation field of the array, wherein the radiation field of the array has an array scan angle local to the array, the array scan angle being free of the phase shift by the metasurface, and wherein the phase shift by the metasurface causes a beam of the phased array antenna to have a beam angle that is angularly offset to be at a lower tilt than the array scan angle of the radiation field of the array.

2. The phased array antenna of claim 1, wherein each dual-polarized radiating element provides isolation in the range of about 40 dB to about 50 dB between transmit and receive ports.

3. The phased array antenna of claim 1, further comprising a plurality of circulators, each circulator being coupled to a respective dual-polarized radiating element.

4. The phased array antenna of claim 1, wherein the metasurface is a single-polarized metasurface, and wherein the phase distribution introduced by the metasurface linearly and continuously increases along a single wave polarization direction.

5. The phased array antenna of claim 1, wherein the metasurface is a dual-polarized metasurface, and wherein the metasurface provides two different phase distributions over two respective orthogonal wave polarization directions.

6. The phased array antenna of claim 5, wherein the metasurface provides a first phase distribution that linearly increases along a first wave polarization direction to cause a constant phase shift to the radiation field of the array along the first wave polarization direction, and wherein the metasurface provides a second phase distribution that varies along a second wave polarization direction orthogonal to the first wave polarization direction to cause a varying phase shift to the radiation field of the array along the second wave polarization direction.

7. The phased array antenna of claim 6, wherein the second phase distribution along the second wave polarization direction causes the varying phase shift of the radiation field of the array along the second wave polarization direction to have a profile in which the phase shift increases from opposite ends of the metasurface along the second wave polarization direction towards a maximum phase shift near a middle of the metasurface along the second wave polarization direction.

8. The phased array antenna of claim 1, wherein the array has a single column of dual-polarized radiating elements.

9. The phased array antenna of claim 1, wherein the array of dual-polarized radiating elements comprises a plurality of columns.

10. The phased array antenna of claim 1, wherein the metasurface provides a linearly increasing phase distribution along the at least one wave polarization direction axis.

11. The phase array antenna of claim 1, wherein the phase shift caused by the phase distribution introduced by the metasurface causes the beam angle of the beam to be at a desired tile angle that is lower than the array scan angle of the radiation field, the array scan angle being at a higher tilt angle to cause self-cancellation of mutual coupling in the array of radiating elements.

12. A base station comprising:
a phased array antenna for transmission and reception of wireless communications, the phased array antenna comprising:
an array of a plurality of radiating elements, the array including at least one column having a plurality of radiating elements, the array being configured to generate a radiation field; and
a metasurface over the array of radiating elements, the metasurface introducing a phase distribution over at least one wave polarization direction to cause a phase offset to the radiation field of the array, wherein the radiation field of the array has an array scan angle local to the array, the array scan angle being free of the phase shift by the metasurface, and wherein the phase shift by the metasurface causes a beam of the phased array antenna to be angularly offset to be lower a lower tilt than the radiation field of the array;
a transmitter coupled to the phased array antenna for providing a transmit signal;
a receiver coupled to the phased array antenna for receiving a receive signal; and
a processing device to control progressive phases applied to the phased array antenna, the processing device being configured to set progressive phases sufficiently high to cause self-cancellation of mutual coupling in the array of radiating elements.

13. The base station of claim 12, wherein the receiver comprises a single self-interference cancellation stage.

14. The base station of claim 12, wherein, in the phased array antenna, the metasurface provides a linearly increasing phase distribution along the at least one wave polarization direction.

15. The base station of claim 12, wherein, in the phased array antenna, the metasurface is a dual-polarized, wherein the metasurface provides a first phase distribution that linearly increases along a first wave polarization direction to cause a constant phase shift to the radiation field of the array along the first wave polarization direction, and wherein the metasurface provides a second phase distribution that varies along a second wave polarization direction orthogonal to the first wave polarization direction to cause a varying phase shift to the radiation field of the array along the second wave polarization direction.

16. The base station of claim 15, wherein the second phase distribution along the second wave polarization direction causes the varying phase shift of the radiation field of the array along the second wave polarization direction to have a profile in which the phase shift increases from opposite ends of the metasurface along the second wave polarization direction towards a maximum phase shift near a middle of the metasurface along the second wave polarization direction.

17. The base station of claim 12, wherein the base station is configured to conduct full-duplex communications using the phased array antenna.

* * * * *